United States Patent Office 2,718,497
Patented Sept. 20, 1955

2,718,497
DRILLING MUDS

Wilbur N. Oldham, Monrovia, Calif., and Edward L. Kropa, Old Greenwich, Conn., assignors, by mesne assignments, to Union Oil Company of California, Los Angeles, Calif., a corporation of California No Drawing. Application November 3, 1950, Serial No. 194,029

26 Claims. (Cl. 252—8.5)

This invention relates to a method of controlling the water loss characteristics of aqueous mud or clay dispersions of the type used in drilling oil, gas or other deep wells. More particularly, the invention includes the addition of novel water loss-controlling reagents to clay base fluid drilling muds and the drilling muds containing these reagents.

In the drilling of oil wells and other deep wells by rotary drilling processes, it is now the practice to recirculate an aqueous fluid called "drilling mud" down through the hollow drill pipe, across the face of the drill bit, and upward through the drill hole. The drilling mud serves to cool and lubricate the drill bit, to raise the drilling cuttings to the surface of the ground, and to seal the sides of the well to prevent loss of water and drilling fluids into the formation through which the drill hole is being bored. After each passage through the well the mud is passed through a settling tank or trough wherein the sand and drill cuttings are separated, with or without screening. The fluid is then again pumped into the drill pipe by a mud pump.

The problem of controlling the viscosity and thixotropic character of aqueous mud dispersions has been solved by the use of bentonitic clays which impart thixotropic characteristics thereto and by the use of inorganic polyphosphates such as sodium tetraphosphate and sodium hexametaphosphate in suitable amounts. However, the problem of water loss control is still a serious one in the drilling of many wells.

Heretofore, the practice has been to add fibrous or flaky materials such as mica, pectate pulp, quebracho, hydrolyzed starch, cellulose and cellulose derivatives such as sulfited cellulose and alkali-reacted celluloses to the mud to assist in reducing the porosity of the mud seal surrounding the drilling hole. Although these materials have been successful in many cases in reducing the loss of water from the mud into the surrounding formation, there is a definite need for a class of reagents such that the sealing properties of muds containing the reagents can be adjusted to meet unusual porosity conditions in the surrounding formation so that water loss control can be obtained even when drilling through highly porous strata of the earth.

It is an object of the present invention to provide aqueous drilling mud additives.

It is a further object of the present invention to provide aqueous mud or clay dispersions containing novel additives.

A further object of the present invention is to control the water loss characteristics of aqueous drilling muds or clay dispersions.

Another object of the present invention is to provide a clay base fluid drilling mud, the sealing properties of which are adapted to meet unusual porosity conditions in the formation being drilled.

It is still another object of the present invention to provide a drilling mud whereby water loss control can be obtained even when drilling through highly porous strata of the earth.

Still another object of the present invention is the addition to aqueous drilling muds of novel water loss-controlling reagents.

It is another object of the present invention to provide a drilling mud additive which will sequester calcium and other alkaline earth metal ions and offset or overcome the flocculating action of sodium chloride and other alkali metal salts on the mud.

The above and other objects are attained by adding to a clay base fluid drilling mud a small amount of a linear hydrocarbon chain polymer or copolymer of relatively high molecular weight in which hydrophilic acid or acid-forming groups are present in amounts corresponding to one such hydrophilic group for each two to three carbon atoms of the linear chain.

The invention will be further illustrated by the following specific examples. It should be understood, however, that while these examples may describe in detail some of the preferred features of the invention, they are given primarily for purposes of illustration and the invention in its broader aspects is not limited thereto.

In the following examples the water loss tests were made on a standard 100 pound wall-building tester, which consists of a 3-inch closed pressure filter connected with a compressed nitrogen tank and provided with a graduate for measuring the volume of filtrate. The water loss values were obtained with 100 pounds' pressure on the filter and an average filtration temperature of 25° C.

In all cases the quantities of reagents added to the drilling mud are given on the dry basis.

EXAMPLE 1

To a solution of 15 grams of acrylic acid in 300 cc. of water there was added a water solution of 0.231 gram of sodium bisulfite followed by the addition of a water solution of 0.6 gram of potassium persulfate while maintaining the temperature at 35° C. The mixture was stirred for 2 hours at the same temperature and allowed to stand overnight. The resulting polyacrylic acid had an estimated molecular weight, based on the viscosity, of about 180,000. According to Ellis, "The Chemistry of Synthetic Resins," page 1071, its structure is shown by the formula:

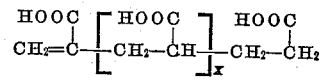

where X is the degree of polymerization.

A drilling fluid having a specific gravity of 1.3 was prepared from a Ventura, California, clay of the calcium bentonite type containing montmorillonite and treated with one-half pound of quebracho and one-half pound of sodium hydroxide per barrel of mud, after which its viscosity was 14 centipoises. A 30-minute water loss test in the 100 pound wall building tester gave a corrected value of 25.9 cc. of filtrate. When one-half pound per barrel of the above polyacrylic acid, measured on the dry basis, was added to the mud the viscosity remained the same but the 30-minute water loss was reduced to 10.7 cc.

When a total of one pound per barrel of the polyacrylic acid was added, the viscosity of the mud was 20 centipoises and the 30-minute water loss was 8.3 cc.

EXAMPLE 2

A polyacrylic acid of higher molecular weight than that of Example 1 was prepared by heating to 90° C. a solution of 15 grams of acrylic acid in 135 grams of water and adding 0.3 cc. of 90% hydrogen peroxide, followed by heating at the same temperature for 23 hours while adding three additional 0.3 cc. portions of the peroxide at intervals. The specific viscosity of a sample diluted with water to 10 times its volume was 0.97 and the estimated molecular weight was about 240,000.

This polyacrylic acid was added to a sample of the mud described in Example 1, containing one-half pound per barrel of quebracho and of sodium hydroxide and having a viscosity of 14 centipoises and a water loss of 25.9 cc. After adding one-half pound per barrel of the polyacrylic acid the viscosity was 16 centipoises and the 30-minute water loss was 13.2 cc. When one pound per barrel was added the viscosity remained at 16 centipoises, but the 30-minute water loss was reduced to 9.3 cc.

To another sample of the same mud there was added one pound per barrel of sodium tetraphosphate ($Na_6P_4O_{13}$) instead of the quebracho and one pound per barrel of the polyacrylic acid. The resulting viscosity was 18 centipoises and the 30-minute water loss was only 5.6 cc.

EXAMPLE 3

Polyacrylic acid compounds capable of reducing water loss in drilling muds can also be prepared by the hydrolysis or saponification of the nitriles, esters, halides, amides and other similar derivatives of polyacrylic acid. Thus, for example, compounds can be prepared from polyacrylonitrile by the following procedure.

A medium molecular weight polymer was prepared by heating a 10% aqueous solution of acrylonitrile containing 1.5% of sodium bisulfite and 3% of ammonium bisulfite, based on the weight of the acrylonitrile, at 40–50° C. for about six hours. The resulting product had a specific viscosity of 10.4; i. e., a 1% solution of the polymer in 100 cc. of 55% solution of sodium thiocyanate possessed a viscosity of 10.4 when compared to the solution without the polymer. The molecular weight was therefore about 340,000.

One portion of the acrylonitrile polymer was saponified by mixing it with a molecular equivalent of sodium hydroxide and injecting steam with vigorous agitation for one hour. Analysis indicated that there was 11.8% of sodium hydroxide as free alkali and 4.37% of nitrogen in the product, and the degree of hydrolysis was 83%. The course of the reaction is as follows:

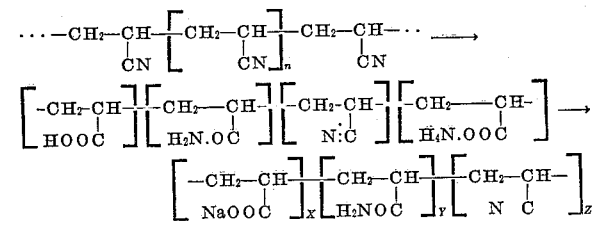

The product is therefore a linear copolymer of sodium polyacrylate, polyacrylamide and polyacrylonitrile in which the ratio of X:Y:Z is approximately 8:1:1.

The product was added to a sample of the Ventura mud described in Example 1 in the amount of one-half pound per barrel together with one pound of quebracho and one pound of sodium hydroxide. The resulting mud had a viscosity of 22 centipoises and a 30-minute water loss of 6.3 cc.

Another test was made on the same mud using one-half pound per barrel of quebracho and one-half pound per barrel of sodium hydroxide and one-half pound per barrel of the reagent. The viscosity was 29 centipoises and the 30-minute water loss was 8.3 cc.

Similar results were obtained with a product prepared by dissolving 10 cc. of acrylyl chloride in 40 cc. of dry toluene, adding 1 gram of alpha, alpha-prime azoisobutyronitrile (Porophor N) and heating at 70° C. for 6 hours. The toluene was decanted from the resulting heavy liquid which was washed with ether and hydrolyzed by adding a hot solution of 10 grams of sodium hydroxide (2 mols per mol of acrylyl chloride) in 25 cc. of water and heating 6.5 hours on a steam bath.

EXAMPLE 4

Another portion of the acrylonitrile polymer of Example 3 was hydrolyzed as described in that example, but only two-thirds of the molecular equivalent of sodium hydroxide was used. Analysis showed 3.7% of free sodium hydroxide and a Kjeldahl nitrogen of 5.33, indicating a hydrolysis of 80%. It is evident from a comparison with Example 3 that a large change in the amount of alkali makes only a relatively small change in the degree of hydrolysis. All of these products appear to contain copolymers of polyacrylonitrile with sodium polyacrylate.

One-half pound per barrel of the above-described product was added to a sample of the mud of Example 1 together with one pound per barrel of quebracho and one of sodium hydroxide. The resulting mud had a viscosity of 27 centipoises and a 30-minute water loss of 5.8 cc.

The product was also tested in a mud having a density of 1.29 prepared from Rodgers Lake clay. When this mud was treated with one-half pound of quebracho and of sodium hydroxide per barrel its viscosity was 20 centipoises and the 30-minute water loss was 8.9 cc. After adding one-quarter of a pound per barrel of the hydrolyzed acrylonitrile polymer the viscosity was 27 centipoises and the 30-minute water loss was 3.6 cc.

EXAMPLE 5

A hydrolyzed polyacrylonitrile, prepared and hydrolyzed with an equimolecular quantity of sodium hydroxide as described in Example 3, had a free alkali content of 12.8% and a nitrogen content of 4.24, indicating a degree of hydrolysis of 84%.

This product was tested in the drilling mud of Example 1 to which 3 pounds per barrel of lime was added, in order to determine the effect of lime on the reagent. The mud also contained one pound of quebracho and one pound of sodium hydroxide per barrel and had a 30-minute water less of 42.4 cc. and a viscosity of 20 centipoises. After adding two pounds per barrel of the hydrolyzed acrylonitrile polymer the 30-minute water less was reduced to 6 cc. and the viscosity was 40 centipoises.

Another sample of the same mud was prepared containing 5 pounds of lime, one pound of quebracho, and one pound of sodium hydroxide per barrel. Its viscosity was 20 centipoises and the 30-minute water loss was 52 cc. After adding 2 pounds per barrel of the hydrolyzed polyacrylonitrile described in Example 4 the 30-minute water loss was 8.6 cc. and the viscosity was 35 centipoises.

EXAMPLE 6

To a solution of 184 grams of acrylamide in 2100 cc. of isopropyl alcohol there was added 1.8 grams of benzoyl peroxide and the mixture was heated under reflux. After boiling for 15 minutes polyacrylamide began to precipitate and after 4 hours the precipitation was complete. The polymer was removed by filtration, washed and dried at 50° C.

The polyacrylamide was hydrolyzed by suspending the polymer in an aqueous solution containing a molecular equivalent of sodium hydroxide and allowing it to stand at 25–30° C. The course of the reaction was followed by measuring the ammonia evolved. When a 1% polyacrylamide suspension was used the extent of the hydrolysis was as follows:

After 1 day_____26.0% hydrolyzed.
After 2 days_____31.1% hydrolyzed.
After 3 days_____33.1% hydrolyzed.
After 4 days_____34.6% hydrolyzed.

At temperatures of 60–70° C. the hydrolysis was much more rapid, and was completed in 1–2 days. These figures show that a gradual evolution of hydrolyzed polyacrylamide can be obtained in a drilling mud during the drilling operation by adding unhydrolyzed polyacrylamide thereto.

EXAMPLE 7

An emulsion copolymer of acrylamide and ethyl acrylate was prepared by the following procedure:

A dispersion of 50 grams of acrylamide and 50 grams of ethyl acrylate in 100 cc. of water containing 1 gram of Duponol C, a commercial wetting agent consisting of a mixture of sulfated lauryl and myristyl alcohols, was prepared. The pH was adjusted to 7.0 by adding disodium acid phosphate, the solution was diluted with water to 500 cc. and heated to boiling after adding 0.2 grams of solid potassium persulfate. The heating was continued until a copolymer having an average molecular weight of 210,000 was obtained.

One-half of the product was added slowly to a solution of 14 grams of sodium hydroxide in 500 cc. of water contained in a flask provided with a steam inlet tube. The steam was injected into the solution for about 30–60 minutes, or until the initially rapid evolution of ammonia had diminished, indicating that the hydrolysis was substantially complete.

EXAMPLE 8

The procedure of Example 7 was repeated, but 75 grams of acrylamide and 25 grams of ethyl acrylate were used. The polymerization was continued for a total of 3 hours, after which time a copolymer having an average molecular weight of 130,000 was obtained.

Part of the product was hydrolyzed with aqueous sodium hydroxide as described in Example 7.

Water loss tests were conducted on a mud having a specific gravity of 1.3 made from Ventura Avenue clay. This mud was treated with 0.5 lb. per barrel of the product under test together with 0.5 lb. per barrel of NaOH and of quebracho. The results were as follows:

| Product | 30-Minute Water Loss (ml.) |
|---|---|
| Ex. 7, unhydrolyzed | 25.4 |
| Ex. 7, hydrolyzed | 13.1 |
| Ex. 8, unhydrolyzed | 24.4 |
| Ex. 8, hydrolyzed | 18.5 |
| Control (no reagent) | 34.0 |

EXAMPLE 9

A dispersion of 75 grams of acrylamide and 25 grams of styrene in 200 grams of water containing 1 gram of Duponol C, the wetting agent of Example 7, was prepared and the pH was adjusted to 7.0 by adding sodium acid phosphate. Sufficient water was added to bring the volume to 500 cc., after which 0.2 gram of potassium persulfate was introduced and the mixture was heated with agitation under reflux. The reaction was fairly mild and after about 2 hours heating another 0.1 gram portion of potassium persulfate was added. The reaction was continued for an additional 5 hours, or until a copolymer having an average molecular weight of 80,000 was obtained. A portion of the product was hydrolyzed with sodium hydroxide as described in Example 7 and the unhydrolyzed and hydrolyzed materials were tested for 30-minute water loss control in the mud described in Example 8 using 0.5 lb. per barrel. The water loss figures were 27.6 ml. and 20.6 ml., respectively.

EXAMPLE 10

A solution of 98 grams of maleic anhydride in 800 cc. of toluene was prepared by heating the mixture to 80° C. with agitation and 104 grams of styrene was added, followed by the addition of 0.5 gram of benzoyl peroxide. The temperature was maintained at 85–95° C. and after 9 minutes the styrene-maleic anhydride copolymer began to form as shown by a cloud in the solution. Additional 0.5 gram portions of the benzoyl peroxide catalyst were added at 16 minutes, 37 minutes and 82 minutes, and after the last addition the slurry was heated to reflux (109° C.) for 65 minutes to insure completion of the reaction. The product was filtered off, washed with benzene and dried 3 hours at 100° C. in a forced draft oven. Its molecular weight was approximately 50,000. Ellis, "The Chemistry of Synthetic Resins," page 244, shows the structure of this type of polymer to be:

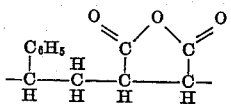

i. e., a long chain of alternate acid anhydride and styrene groups.

A sample of the product was added to a sample of the drilling mud of Example 1, using 1 pound reagent per barrel of mud, along with 0.5 pound per barrel of sodium hydroxide and of quebracho. The viscosity of the treated mud was 22 centipoises and the 30-minute water loss was 4.6 cc.

Another sample was dissolved in methyl ethyl ketone and saponified by pouring the resulting solution into dilute sodium hydroxide solution. When the saponified product was added to another sample of the same mud, using 1 pound per barrel and 0.5 pound per barrel of quebracho and NaOH, the same viscosity and water loss figures were obtained.

In another test, quantities of 0.5 pound per barrel of the above two products (i. e. the unsaponified and the saponified copolymer) were added to samples of the same mud containing 1 pound per barrel of sodium hydroxide and of quebracho. In both cases the viscosity of the treated mud was 22 centipoises, the 30-minute water loss figures were 7.6 cc. and 9.2 cc., respectively.

EXAMPLE 11

A solution of 177 grams (1.5 mols) of alpha-methylstyrene and 147 grams of maleic anhydride in 800 cc. of toluene was heated to 72° C. and 2 grams of benzoyl peroxide was added. The mixture was stirred at 95–100° C. and additional 0.5 gram quantities of benzoyl peroxide were added after 42 minutes and 2.5 hours. After 4 hours a further 1 gram of the catalyst was added and the heating was continued for a total of 19.5 hours. The precipitated copolymer was then filtered off and dried.

The product was tested in a Ventura mud having a specific gravity of 1.33, using 1 pound per barrel of quebracho and 1 pound of the maleic-methylstyrene copolymer. The viscosity was 12 centipoises and the 30-minute water loss was 12.2.

EXAMPLE 12

Copolymer A

A styrene-alpha-methylstyrene-maleic anhydride copolymer was prepared by reacting together 78 grams (0.75 mol) of styrene, 88 grams (0.75 mol) of alpha-methylstyrene and 147 grams (1.5 mols) of maleic anhydride in 800 cc. of toluene. The procedure described in Example II was followed, but the first addition of 1 gram of benzoyl peroxide was sufficient to complete the polymerization and the heating was stopped after 200 minutes at 72–80° C. The toluene was poured from the product which was then dissolved by refluxing in 800 cc. of acetone. Upon evaporation of the acetone a copolymer having an approximate molecular weight of about 30,000 was obtained.

Copolymer B

In this product only one-tenth of the styrene was replaced by alpha-methylstyrene. A mixture of 140 grams of styrene, 18 grams of alpha-methylstyrene and 147 grams of maleic anhydride in 800 cc. of toluene was polymerized at 75° C. by the addition of 1 gram of benzoyl peroxide, using the procedure described above.

Copolymer C

A mixture of 95 grams of acrylonitrile and 5 grams vinyl acetate was copolymerized by heating with sodium and ammonium bisulfites, as described in Example 3. The product was mixed with a solution of 74 grams of NaOH in 800 grams of water and hydrolyzed by the injection of steam for about 3 hours, or until a clear yellow, viscous solution was obtained.

EXAMPLE 13

In order to show the effect of molecular weight of the polymer on water loss control a series of acrylonitrile polymers was prepared in which the polymerization was carried out in a solution of an aliphatic monohydric alcohol of 1-3 carbon atoms at 10% monomer concentration, the degree of polymerization being controlled by the amount of alcohol present. The concentration of alcohol in the water-alcohol solvent was varied from 1.25% to 25%, giving polymers whose specific viscosities ranged from 0.61 to 6.03. From these values the molecular weight was determined by the formula (see Ellis, "The Chemistry of Synthetic Resins," 1935 edition, page 73)

$$\text{Mol. wt.} = \frac{\text{Sp. viscosity}}{K_m C}$$

the value for C being 0.189 and $K_m$ being $1.5 \times 10^{-4}$. Specific viscosities of the polyacrylonitriles were determined in dimethylformamide (1 gram of polymer per 100 ml. of solution) using an Ostwald-Fenske viscosimeter No. 100 at 25° C. The viscosities of the hydrolyzed polyacrylonitriles were determined in 1% water solution using the same instrument.

The polymerization procedure followed in sample No. 6 is typical. A solution containing 45 grams of ethanol and 830 grams of water was charged into a reaction flask equipped with a stirrer and reflux condenser and heated to 60 °C. and 100 grams of acrylonitrile was added. The solution was heated to reflux (72° C.) and 2 grams of ammonium persulfate, dissolved in 25 grams of water, was added. Polymerization started immediately. The mixture was stirred under a slow stream of nitrogen for a total of 90 minutes, during which time the temperature rose gradually to 92° C. as the monomer was consumed. The mixture was then cooled and the polymer collected on a filter and washed twice with water and then with methanol and dried at 70° C. The product was a fine, nearly white powder.

The hydrolysis procedure used in sample No. 6 is also typical. A reaction flask was charged with 53 grams of the polyacrylonitrile and a solution of 80 grams of sodium hydroxide in 354 grams of water and the mixture was stirred for 15 minutes at room temperature. An oil bath maintained at 135-140° C. was then applied to the flask for about 8 minutes, or until the solution temperature reached 83° C. The hydrolysis was continued with stirring and intermittent heating in this manner for a total of 130 minutes as the internal temperature increased gradually to 106° C. Completion of the reaction was shown by the disappearance of the red-orange color that was first developed. The calculated concentration of free NaOH was 8.5%.

The hydrolyzed products were added to samples of the Ventura mud described in Example 1, using 1 lb. per barrel along with 0.5 lb. per barrel of quebracho and 0.5 lb. per barrel of added sodium hydroxide in addition to that present in the sodium polyacrylate, and water loss tests were made. The results are summarized in the following table. In the headings of this table the amount of sodium polyacrylate and of free NaOH is expressed as percent by weight and the specific viscosities are given for 1% solutions, as explained above.

| Sample No. 6 | Polymerization Medium | Sp. Vis. | Mol. Wt. | Conc. Na. Salt | Free NaOH | Sp. Vis. | Water Loss cc./30 min. |
|---|---|---|---|---|---|---|---|
| 1 | 10% Isopropanol | 0.51 | 18,000 | 20 | 8.5 | | 21.0 |
| 2 | 25% Ethanol | 0.61 | 21,500 | 20 | 8.5 | 0.71 | 19.5 |
| 3 | 10% Ethanol | 0.65 | 23,000 | 20 | 8.5 | | 19.0 |
| 4 | 9.7% Ethanol | 1.17 | 41,000 | 20 | 8.5 | 1.72 | 18.0 |
| 5 | 7.5% Ethanol | 1.71 | 60,000 | 20 | 8.5 | 2.85 | 13.5 |
| 6 | 5% Ethanol | 2.55 | 90,000 | 20 | 8.5 | 4.47 | 13.3 |
| 7 | 3.5% Ethanol | 3.37 | 119,000 | 19.8 | 8.4 | 6.78 | 12.5 |
| 8 | 2.5% Ethanol | 4.52 | 159,000 | 15.1 | 6.4 | 9.21 | 8.8 |
| 9 | 1.25% Ethanol | 6.03 | 213,000 | 8.3 | 3.6 | 25.6 | 7.5 |
| 10 | Water | 11.6 | 410,000 | 3.5 | 1.5 | Very high | 7.3 |

EXAMPLE 14

38 grams of maleic anhydride
22.1 grams of isobutylene
0.6 gram of benzoyl peroxide The above ingredients were placed in a suitable closed vessel and heated for 6.5 hours at 40° C. The tough white product obtained was dried by heating at 100° C. for two hours and then ground in a suitable mill to pass 20 mesh. The product was washed with toluene to remove unreacted maleic anhydride and then dried. Analysis showed that the copolymer contained 57.3% carbon and 5.7% hydrogen or, calculating on the basis of oxygen balance, 76% maleic anhydride.

A 2-gram sample of the copolymer was heated at about 100° C. for 7 hours with 53.3 ml. of 0.5 N aqueous sodium hydroxide solution. The resulting solution of the sodium salt of the isobutylene-maleic anhydride copolymer was concentrated to a 5% solution, one pound of which per barrel of drilling mud was added to a sample of the Ventura mud described in Example 1 which contained a half pound of quebracho and a half pound of sodium hydroxide per barrel. The 30-minute water loss was 9.4 cc.

When the copolymer salt solution was concentrated to 10% strength and added to a sample of the Ventura clay composition of Example 1 in a concentration of two pounds per barrel of mud, the 30-minute water loss was 5.7 cc.

EXAMPLE 15

A mixture of hydrolyzed polyacrylonitrile and quebracho prepared as described in detail below was added to the mud used in drilling a well in Jim Wells County, Texas. Native clays and shales were the principal solid components of the drilling mud above 4000 feet, and water alone was used for viscosity control to this depth. At 4000 feet, the mud was treated with quebracho, caustic soda, phosphates and the hydrolyzed polyacrylonitrile reagent. After the initial treatment at 4000 feet, the mud properties were controlled by subsequent additions of the above-mentioned additives and of water.

When the hydrolyzed polyacrylonitrile reagent was first added to the drilling mud, its viscosity and gel strength rose sharply and remained comparatively high until the concentration of reagent reached 0.25 lb. per barrel and the mud had made a complete circulation through the well. After the concentration of reagent reached 0.5 lb.

per barrel, the viscosity and gel strength dropped to below the values recorded prior to addition of the reagent.

The mud history of this well over a period of two weeks is shown in the following table:

aliphatic monocarboxylic acids such as acrylic acid, methacrylic acid, etc., and the hydrolyzed and/or saponified polymers of their acid-forming derivatives, i. e. the corresponding amides, nitriles and esters. The exact

| Depth (ft.) | Mud Volume (bbl.) | Hydrolyzed Polyacrylonitrile Reagent (lbs. based on solids content) | Baroid (lbs.) (Barium sulfate) | Aquagel (lbs.) (Colloidal Bentonite Clay) | Polyfos (lbs.) (Sodium Triphosphate) | Quebracho (lbs.) | Caustic Soda (lbs.) | Viscosity, Stormer (cps.) | Gel Strength (gms.) | | Water Loss (cc.) 30 mins. |
|---|---|---|---|---|---|---|---|---|---|---|---|
| | | | | | | | | | Initial | 10 mins. | |
| 4,342 | 804 | | | | 650 | 450 | 200 | 35 | 7 | 46 | 19.2 |
| 4,342 | 804 | 350 | | | 300 | | | 30 | 4 | 15 | 7.0 |
| 4,500 | | | | | | | | 20 | 2 | 9 | 7.0 |
| 4,600 | | | | | | | | 28 | 4 | 20 | 6.6 |
| 4,700 | | | | | | | | 28 | 4 | 75 | 2.8 |
| 5,181 | | | | | 100 | | | 21 | 2 | 45 | 8.0 |
| 5,600 | 898 | 85 | | | 500 | | | | | | |
| 5,750 | 906 | | | | | 100 | 25 | 18 | 0 | 47 | 10.4 |
| 6,015 | 926 | 170 | 41,300 | | 400 | 100 | 50 | 40 | 0 | 38 | 9.2 |
| 6,085 | 931 | 178 | | | | | | 35 | 1 | 20 | 6.6 |
| 6,341 | 950 | | | | | | | 32 | 0 | 5 | 5.2 |
| 6,505 | 961 | | | | 50 | | | | | | |
| 6,582 | | | | | 100 | | | | | | |
| 6,587 | 965 | | | | 50 | | | 45 | 0 | 14 | 4.9 |
| 6,605 | | | | | 150 | | | | | | |
| 6,630 | 970 | | 22,500 | 100 | 250 | | | 55 | 1 | 10 | 5.0 |
| 6,747 | 979 | | | | 600 | 200 | 100 | | | | |
| 6,852 | 986 | | | | 300 | 200 | 100 | | | | |
| 6,891 | 988 | | 1,300 | | 250 | 50 | 50 | 50 | 2 | 12 | 4.6 |
| 6,900 | 990 | | 1,000 | | 100 | | | 45 | 0 | 9 | 5.4 |
| Total | | 783 | 66,100 | 100 | 3,800 | 1,100 | 525 | | | | |

*Preparation of hydrolyzed polyacrylonitrile reagent used in Example 15*

A stainless steel tank was filled with 378 gals. of de-ionized water, and under an atmosphere of carbon dioxide gas were added 20 cc. of 36 N sulfuric acid to lower the initial pH and 2,000 g. of sodium sulfate to control particle agglomeration of the polymer. 149 lbs. of steam-distilled acrylonitrile were mixed with the contents of the tank by means of both agitator and pump for from 10 to 15 mins. to ensure complete solution of the acrylonitrile monomer, and the temperature was adjusted during that time to 30° C. by use of steam and water in an immersed coil. 746 g. of sodium bisulfite dissolved in 5 gal. of de-ionized water were pumped in and immediately after addition of the first part thereof, 1935 g. of potassium persulfate dissolved in 20 gal. of de-ionized water were added. Agitation and cooling to a temperature below 35° C. were continued for 4 hours, the reaction mixture was filtered in a plate and frame press, the product was oven dried at 60° C., and the dried polymer was granulated and screened.

132.5 lbs. of a blend of several batches of polyacrylonitrile prepared in general by the method set forth above and containing 94.15% polymer were added gradually to a mixture of 132.9 gals. of water and 97.1 lbs. of sodium hydroxide which had been heated in a kettle to about 90° C. in 25 mins. The addition was completed in about 1½ hours during which time the temperature was maintained at about 86°–92° C. Heating was continued for 15 mins. after all of the polymer was added. 55.4 lbs. of quebracho were then added and the mixture was heated for another 1½ hrs. The product which contained 16% hydrolyzed and saponified polyacrylonitrile and 4% quebracho was dumped hot into shipping drums.

In its broader aspects our invention includes the use in a clay base fluid drilling mud of any linear hydrocarbon chain polymer or copolymer of relatively high molecular weight in which hydrophilic acid or acid-forming groups are present in amounts corresponding to one such hydrophilic group for each 2 to 3 carbon atoms of the linear hydrocarbon chain so that a hydrolyzed product containing one carboxylic acid salt group for each 2 to 6 linear chain carbon atoms can be obtained by hydrolyzing at least 50% of the acid-forming groups to carboxyls.

Our preferred class of materials comprises the water-soluble or water-dispersible polymers of unsaturated aliphatic monocarboxylic acids such as acrylic acid, methacrylic acid, etc., and the hydrolyzed and/or saponified polymers of their acid-forming derivatives, i. e. the corresponding amides, nitriles and esters. The exact structure of the preferred polymers is uncertain, but it may be represented in a simplified form as follows in order to facilitate determination of which polymers are suitable as drilling mud additives in accordance with our invention:

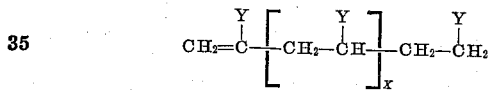

where Y is —COOH, —CONH$_2$, —CN or —COOM where M is a monovalent salt-forming radical such as sodium, potassium or ammonium and $x$ is the degree of polymerization, which is preferably about 200–6,000. In these polymers the ratio of hydrophilic acid or acid-forming radicals to carbon atoms in the polymer chain is from 1:2 to 1:3. Best results are obtained when at least 50%, and preferably 60% to 95%, of the hydrophilic acid or acid-forming radicals are carboxylic acid salt groups (Y is —COOM). After at least 50% of the acid-forming radicals are hydrolyzed, where necessary, and saponified, the corresponding ratio of carboxylic acid salt groups to linear chain carbon atoms is from 1:2 to 1:6, inclusive.

Examples of polymers included within our preferred class of materials are the water-soluble or water-dispersible polymers obtained by polymerizing unsaturated aliphatic monocarboxylic acids such as acrylic acid, methacrylic acid, etc., and the corresponding acrylamide, methacrylamide, acrylonitrile, methacrylonitrile, the alkyl esters of acrylic acid such as methyl acrylate, ethyl acrylate, butyl acrylate, etc. and of methacrylic acid such as methyl methacrylate, ethyl methylacrylate, butyl methylacrylate, etc., preferably with the aid of polymerization catalysts such as hydrogen peroxide, benzoyl peroxide, lauroyl peroxide and other organic peroxides, alone or with one of the alkali bisulfites or other reducing agent as a promoter, and then reacting the so-formed polymer with a water-soluble alkali such as an alkali metal or ammonium hydroxide or a strong organic base such as triethanolamine, benzyltrimethylammonium hydroxide, etc., to hydrolyze or saponify acid and/or acid-forming groups of the polymer.

Other unsaturated aliphatic monocarboxylic acids and their acid-forming derivatives such as vinylacetic acid and its corresponding amide, nitrile, and alkyl esters, etc., may be substituted for the preferred class of acrylic derivatives.

In addition to the polymers described above, linear copolymers may also be employed. Thus, copolymers of two or more of the acrylic and methacrylic derivatives disclosed above may be prepared, for example, a copolymer of acrylamide and ethyl acrylate. Furthermore, the acrylic or methacrylic derivatives may be copolymerized with other polymerizable materials such as maleic acid and/or anhydride, benzyl maleic acid, phenyl maleic acid, fumaric acid, crotonic acid, mesaconic acid, itaconic acid, citraconic acid, styrene, hydrocarbon-substituted styrenes such as alpha methyl styrene, para methyl styrene, 2,4-dimethylstyrene, and the like, halogenated styrenes such as the o-, m-, and p-chlorostyrenes, 2,4-dibromostyrene, and the like, vinyl esters such as vinyl acetate, etc., vinyl ethers such as vinyl ethyl ether, etc., vinyl halides such as vinyl chloride, etc., unsaturated hydrocarbons such as isobutylene, and the like.

Copolymers not derived from the acrylic or methacrylic compounds are also useful in accordance with the present invention and copolymers of certain of the polymerizable unsaturated compounds mentioned above may be added to drilling muds to effectively control water less. It must only be borne in mind, as any resin chemist knows, that at least one of the copolymerizing materials must contain a $CH_2=C<$ or vinyl group. Thus, while maleic anhydride alone will not form a polymer, it will readily copolymerize with such materials as styrene and isobutylene or, of course, with any of the acrylic or methacrylic materials, to form a useful copolymer.

Generally speaking, any linear hydrocarbon polymers or copolymers which contain acid or acid-forming groups in amounts corresponding to one such group for each 2 to 3 carbon atoms of the linear hydrocarbon chain are suitable drilling mud additives in accordance with our invention.

In order to obtain optimum wall-sealing properties the linear polymers used in practicing the present invention should have a substantial molecular weight. We find that in most cases the minimum range of molecular weight values should be on the order of from about 10,000 to about 40,000, which corresponds (in the case of acrylic and methacrylic acid polymers) to a degree of polymerization of approximately 200–500. As the molecular weight increases from the minimum range to that of the higher polymers having molecular weights on the order of 2,000,000 or more, there is a marked increase in the efficiency of the polymers as wall-sealing agents. Our preferred range of molecular weights is in the neighborhood of from about 50,000–300,000, corresponding to a degree of polymerization for acrylic acid polymers of about 1,400–6,000.

Although increased wall-sealing efficiency is obtained by adding the higher molecular weight polymers to drilling muds it should be noted that this effect is usually accompanied by an increase in viscosity, i. e., an increase in the molecular weight results in lower water loss but higher mud viscosity. However, some muds can tolerate hydrolyzed linear aliphatic acid polymers of molecular weights of, for example, 300,000–400,000 while other muds react better in all-around characteristics to polymers having molecular weights of, for example, 100,000 to 250,000. In any case, however, the viscosity increase can be controlled by the addition of polyphosphates such as sodium tetraphosphate or sodium hexametaphosphate or of quebracho. Moreover, the increase in viscosity caused by our higher polymers is not accompanied by an increase in gel strength; in fact, the reverse is usually true and we obtain low gel strengths at the higher viscosities so that the mud can be easily pumped.

As is indicated above, the most effective water-solubilizing or hydrophilic groups in our linear polymers are —COOM groups in which M is alkali metal or ammonium. These groups may be formed either by hydrolysis of the corresponding —CN, —CONH₂ or —COOR radicals, wherein R is the residue of an alcohol such as methanol, ethanol, propanol, and the like, or by the saponification of free —COOH groups. These hydrolysis or saponification reactions may be carried out during the preparation of the reagent or, in some cases, after the reagent has been added to the mud. Thus, for example, a polyacrylamide can be added to the drilling mud in an unhydrolyzed condition, substantially all of the hydrophilic radicals being present as —CONH₂ groups, together with sodium or potassium hydroxide or carbonate or other alkaline materials which are ordinarily added to drilling muds. Under normal well-drilling conditions, and particularly in fairly deep wells where the temperature of the mud increases during use, the amide groups are hydrolyzed to —COOM groups. Similarly, a polyacrylonitrile may be added directly to the mud where its nitrile groups will be hydrolyzed first to amide groups and then to —COOM groups. This feature of the invention is important in making additions of wall-sealing reagent to the mud after the drilling operation has been started, since it permits the operator to add a considerable quantity of the reagent at one time, if desired, in order to maintain a reserve of potential carboxylic acid-forming material in the mud which becomes effective as the drilling progresses.

If desired free polyacrylic acid may be added to an alkaline dispersion of drilling mud whereby a salt thereof is formed in situ. The polymeric acid can be precipitated from the alkaline solution as initially prepared by hydrolysis of polyacrylonitrile, provided the hydrolysis is not carried to above approximately 90 percent. When a polyacrylonitrile is saponified with two moles of sodium hydroxide under conditions such that the degree of saponification amounts to approximately 93 percent, the polymer material cannot be precipitated with mineral acids. A certain amount of haze appears in the solution but no polymer precipitates. On the other hand, when polyacrylonitrile is hydrolyzed with only one mole of sodium hydroxide and the extent of hydrolysis is about 84 percent, the polymer can be precipitated from its solution by the addition of either hydrochloric acid or sulfuric acid. The polymeric acid, on addition to alkali, re-disperses, and can be added to the mud. This feature of the invention is of considerable practical importance.

The quantities of linear polymer derivatives to be incorporated into the drilling mud may vary throughout a relatively wide range, depending upon the particular conditions encountered during the drilling operation. In some cases as little as 0.2 lb. per barrel of mud may be used while in other, but unusual, circumstances it may be advisable to add as much as 6–8 lbs. per barrel. In most cases, however, quantities on the order of 0.5–1 lb. per 42 gal. barrel of drilling mud are adequate. In the claims, the expression "small amount" is intended to designate quantities of from about 0.2–8 lbs. per 42 gal. barrel of mud.

If additional toughness is desired in the mud wall, it may be preferable to add other wall-building reagents to the drilling mud instead of increasing the quantity of our new additives. Our invention therefore contemplates the use of our linear polymers or copolymers together with wall-building materials as quebracho, pectate pulp, and the like as well as in conjunction with other more or less conventional treating or conditioning agents such as nigrosine, lime, the alkali metal polyphosphates, the starches, lignin derivatives, weighting agents such as barytes, iron oxide, etc., and the like. As a matter of fact, we actually prefer incorporating a quantity, i. e., about 10% to 20%, based on the weight of the composition, of quebracho with our polymers or copolymers for addition to aqueous clay dispersions.

It is a further advantage of the present invention that when polymers or copolymers containing 50% or more of their acid-forming groups as carboxylic acid radicals, most or all of which are present as hydrophilic salts such as alkali metal or ammonium salts, are used, the additive will sequester a limited quantity of calcium and other alkaline earth metal ions and will offset or overcome the flocculating action of sodium chloride and other alkali metal salts on the mud.

While we make no claims as to the exact mechanism by which these novel mud treating chemicals work in reducing water loss values of clay base drilling fluids, those working in the field of colloidal chemistry will appreciate the possibilities of neutralizing and adsorptive reactions that may occur between these materials and hydrated clay. It is noteworthy that these materials confer an exceptional stability on the properties of drilling fluids and such fluids are capable of withstanding considerable contamination or dilution with water without materially effecting the mud properties.

This is a continuation-in-part of our copending application, Serial No. 67,087 filed December 23, 1948, and now abandoned.

We claim:

1. A drilling fluid comprising an aqueous clay dispersion and, as a wall-sealing agent, an amount of a linear hydrocarbon chain polymer having a molecular weight greater than 10,000 and containing carboxylic acid salt groups selected from the group consisting of the alkali metal and ammonium salts in a ratio of one carboxylic salt group to each two to six linear chain carbon atoms sufficient to reduce the water loss due to filtration without increasing the viscosity of said fluid to such an extent that it cannot be circulated.

2. A drilling fluid comprising an aqueous clay dispersion and, as a wall-sealing agent, an amount of a linear hydrocarbon chain polymer having a molecular weight of about 100,000 to 400,000 and containing carboxylic acid salt groups selected from the group consisting of the alkali metal and ammonium salts in a ratio of one carboxylic salt group to each two to six linear chain carbon atoms sufficient to reduce the water loss due to filtration without increasing the viscosity of said fluid to such an extent that it cannot be circulated.

3. A drilling fluid as in claim 1 wherein the linear hydrocarbon chain polymer is selected from the class consisting of: (1) a hydrolyzed and saponified polyacrylonitrile, (2) a hydrolyzed and saponified polyacrylamide, (3) a hydrolyzed and saponified linear copolymer of acrylamide and styrene, (4) a saponified linear copolymer of maleic anhydride and styrene, (5) a saponified linear copolymer of maleic anhydride and isobutylene, (6) a hydrolyzed and saponified linear copolymer of acrylamide and a member of the class consisting of esters of acrylic and methacrylic acid with alcohols containing from 1–4 carbon atoms, and (7) a hydrolyzed and saponified linear copolymer of acrylonitrile and vinyl acetate.

4. A drilling fluid as in claim 1 wherein the linear hydrocarbon chain polymer is a hydrolyzed and saponified polyacrylonitrile.

5. A drilling fluid as in claim 1 wherein the linear hydrocarbon chain polymer is a hydrolyzed and saponified polyacrylamide.

6. A drilling fluid as defined in claim 1 wherein the linear hydrocarbon chain polymer is a partially hydrolyzed and saponified polyacrylamide having a molecular weight within the range of 50,000 to 300,000 and is provided in an amount representing between about 0.2 and about 8 pounds per 42-gallon barrel of fluid.

7. A drilling fluid as in claim 1 wherein the linear hydrocarbon chain polymer is a hydrolyzed and saponified linear copolymer of acrylamide and styrene.

8. A drilling fluid as in claim 1 wherein the linear hydrocarbon chain polymer is a saponified linear copolymer of maleic anhydride and styrene.

9. A drilling fluid as in claim 1 wherein the linear hydrocarbon chain polymer is a saponified linear copolymer of maleic anhydride and isobutylene.

10. A drilling fluid as in claim 1 wherein the ratio of carboxylic acid salt groups to linear chain carbon atoms is from 1:2 to 1:3.

11. A drilling mud comprising clay, water and the product obtained by partially hydrolyzing and saponifying a polyacrylonitrile with aqueous alkali until from about 60 to about 95 per cent of its nitrile groups are transformed into —COOM groups where M is a member of the class consisting of alkali-metal and ammonium, said partially hydrolyzed acrylonitrile having a molecular weight between about 50,000 and about 300,000 and being present in an amount sufficient to reduce the water loss due to filtration without increasing the viscosity of said fluid to such an extent that it cannot be circulated.

12. A drilling fluid as defined in claim 11 wherein the partially hydrolyzed and saponified polyacrylonitrile is provided in an amount representing between about 0.2 and about 8 pounds per 42-gallon barrel of fluid.

13. A drilling fluid comprising an aqueous clay dispersion and, as a wall-sealing agent, a mixture containing a linear hydrocarbon chain polymer having a molecular weight greater than 10,000 and containing carboxylic acid salt groups selected from the group consisting of the alkali metal and ammonium salts in a ratio of one carboxylic salt group to each two to six linear chain carbon atoms, and quebracho, said mixture being present in an amount sufficient to reduce the water loss due to filtration without increasing the viscosity of said fluid to such an extent that it cannot be circulated.

14. A drilling fluid comprising an aqueous clay dispersion and, as a wall-sealing agent, a small amount of a mixture containing from about 10%–20% of quebracho and from about 90%–80% of a hydrolyzed and saponified polyacrylonitrile having a molecular weight greater than 10,000.

15. In a process for drilling a well wherein there is circulated in the well an aqueous clay base drilling mud, the method of forming an improved mud seal on the wall of said well which comprises admixing with said drilling mud, as a wall-sealing agent, an amount of a linear hydrocarbon chain polymer having a molecular weight greater than 10,000 and containing carboxylic acid salt groups selected from the group consisting of the alkali metal and ammonium salts in a ratio of one carboxylic salt group to each two to six linear chain carbon atoms sufficient to reduce the water loss due to filtration through said mud seal without increasing the viscosity of said mud to such an extent that it cannot be circulated and contracting the wall of said well with the resulting drilling mud to form said mud seal thereon.

16. In a process for drilling a well wherein there is circulated in the well an aqueous clay base drilling mud, the method of forming an improved mud seal on the wall of said well which comprises admixing with said drilling mud, as a wall-sealing agent, an amount of a linear hydrocarbon chain polymer having a molecular weight of about 100,000 to 400,000 and containing carboxylic acid salt groups selected from the group consisting of the alkali metal and ammonium salts in a ratio of one carboxylic salt group to each two to six linear chain carbon atoms sufficient to reduce the water loss due to filtration through said mud seal without increasing the viscosity of said mud to such an extent that it cannot be circulated and contacting the wall of said well with the resulting drilling mud to form said mud seal thereon.

17. A process according to claim 16, wherein a hydrolyzed and saponified polyacrylonitrile is the wall-sealing agent.

18. A process according to claim 16 wherein the said linear hydrocarbon chain polymer is the product obtained by partially hydrolyzing and saponifying polyacrylonitrile with aqueous alkali until between about 60 and about 95 per cent of its nitrile groups are transformed into —COOM groups where M is a member of the group consisting of alkali-metal and ammonium.

19. A process according to claim 16 wherein the said linear hydrocarbon chain polymer is the product obtained by partially hydrolyzing and saponifying polyacrylamide with aqueous alkali until between about 60 and about 95 per cent of its amide groups are transformed into —COOM groups where M is a member of the group consisting of alkali-metal and ammonium.

20. In a process for drilling a well wherein there is circulated in the well an aqueous clay base drilling mud, the method of forming an improved mud seal on the wall of said well which comprises admixing with said drilling mud a water-soluble alkali and, as a wall-sealing agent, an amount of polyacrylamide sufficient to reduce the water loss due to filtration through said mud seal without increasing the viscosity of said mud to such an extent that it cannot be circulated, and contacting the wall of said well with the resulting mud to form said seal thereon, said alkali reacting with said polyacrylamide during said circulation to form hydrolyzed and saponified polyacrylamide.

21. In a process for drilling a well wherein there is circulated in the well an aqueous clay base drilling mud, the method of forming an improved mud seal on the wall of said well which comprises admixing with said drilling mud a water soluble alkali and, as a wall-sealing agent, an amount of polyacrylonitrile sufficient to reduce the water loss due to filtration through said mud seal without increasing the viscosity of said mud to such an extent that it cannot be circulated, and contacting the wall of said well with the resulting mud to form said seal thereon, said alkali reacting with said polyacrylonitrile during said circulation to form hydrolyzed and saponified polyacrylonitrile.

22. A drilling fluid for the drilling of oil and gas wells which comprises an inorganic solid suspending agent, an aqueous dispersing medium and an amount of a water-soluble alkali metal salt of a polyacrylic acid sufficient to reduce the water loss due to filtration without increasing the viscosity of said well drilling fluid to such an extent that it cannot be circulated, said polyacrylic acid having a molecular weight of at least 10,000.

23. A drilling fluid for the drilling of oil and gas wells which comprises an inorganic solid suspending agent, an aqueous dispersing medium, and a salt selected from the group consisting of alkali metal and ammonium salts of a polymer of acrylic acid having a molecular weight of at least 10,000, said polymer comprising a minor proportion of a polymerized copolymerization agent selected from the class consisting of low molecular weight esters and nitriles of 3 and 4 carbon alpha-beta unsaturated acids, said acrylic acid polymer salt being present in an amount sufficient to reduce the water loss due to filtration without increasing the viscosity of said well drilling fluid to such an extent that it cannot be circulated.

24. A drilling fluid for the drilling of oil and gas wells which comprises an inorganic solid suspending agent, an aqueous dispersing medium, and a water-soluble alkali metal salt of a polyacrylic acid having a molecular weight of at least 10,000 and having a minor proportion of acrylonitrile groups combined therein, said salt being present in an amount sufficient to reduce the water loss due to filtration without increasing the viscosity of said well drilling fluid to such an extent that it cannot be circulated.

25. A drilling fluid for the drilling of oil and gas wells which comprises an inorganic solid suspending agent, an aqueous dispersing medium, and a water-soluble salt selected from the group consisting of alkali metal and ammonium salts of a polymer of an alpha-beta unsaturated acid selected from the group consisting of acrylic and methacrylic acids, said polymer having a molecular weight of at least 10,000, said salt being present in an amount sufficient to reduce the water loss due to filtration without increasing the viscosity of said well drilling fluid to such an extent that it cannot be circulated.

26. A drilling fluid for the drilling of oil and gas wells which comprises an inorganic solid suspending agent, an aqueous dispersing medium, and an alkali metal salt of a polymer of acrylic acid having a molecular weight of at least 10,000, said polymer comprising a minor proportion of a polymerized copolymerization agent selected from the class consisting of low molecular weight esters and nitriles of 3 and 4 carbon alpha-beta unsaturated acids, said acrylic acid polymer salt being present in an amount sufficient to reduce the water loss due to filtration without increasing the viscosity of said well drilling fluid to such an extent that it cannot be circulated.

References Cited in the file of this patent

UNITED STATES PATENTS

| | | |
|---|---|---|
| 2,109,858 | Cannon | Mar. 1, 1938 |
| 2,317,328 | Kinney | Apr. 20, 1943 |
| 2,490,677 | Cupery | Dec. 6, 1949 |
| 2,552,775 | Fischer | May 15, 1951 |

FOREIGN PATENTS

| | | |
|---|---|---|
| 475,671 | Great Britain | Nov. 24, 1937 |

OTHER REFERENCES

Perkins et al. The Effect of Certain Gums and Starches on Filtration of Salt Water Muds at Elevated Temperatures; article in the Oil Weekly, November 2, 1942, page 45–8.5(129).